US005378002A

United States Patent [19]

Röhm

[11] Patent Number: 5,378,002

[45] Date of Patent: Jan. 3, 1995

[54] SELF-TIGHTENING DRILL CHUCK

[76] Inventor: Günter H. Röhm, Heinrich-Röhm-Strasse 50, 89567 Sontheim, Germany

[21] Appl. No.: 153,441

[22] Filed: Nov. 16, 1993

[30] Foreign Application Priority Data

Nov. 16, 1992 [DE] Germany ............................ 4238465

[51] Int. Cl.[6] .............................................. B23B 31/12

[52] U.S. Cl. ...................................... 279/62; 279/140; 279/902

[58] Field of Search .................................... 279/60–65, 279/140, 902

[56] References Cited

U.S. PATENT DOCUMENTS

| | | | |
|---|---|---|---|
| 4,836,563 | 6/1989 | Rohm | 279/63 |
| 4,955,623 | 9/1990 | Rohm | 279/60 |
| 5,054,796 | 10/1991 | Rohm | 279/63 |
| 5,145,192 | 9/1992 | Rohm | 279/62 |
| 5,171,030 | 12/1992 | Rohm | 279/62 |
| 5,236,206 | 8/1993 | Rohm | 279/902 |

*Primary Examiner*—Steven C. Bishop
*Attorney, Agent, or Firm*—Herbert Dubno; Andrew Wilford

[57] ABSTRACT

A drill chuck has an axially centered chuck body, an adjustment body rotatable but axially fixed on the chuck body, and jaws radially displaceable on the chuck body. The adjustment body is formed with a screwthread meshing with teeth of the jaws so that relative rotation of the bodies in a tightening direction moves the jaws together and opposite rotation moves them apart. A radially outwardly projecting tab fixed on the chuck body has a pair of angularly oppositely directed end faces and a locking ring axially displaceable on the chuck body between freeing locking positions is formed with an inwardly open pocket receiving the tab and having a pair of angularly confronting end faces engageable with the respective end faces of the tab and spaced angularly apart by a distance substantially greater than the tab width. A tightening spring connected between the locking ring and chuck body urges the locking ring in the tightening direction. Axially interengageable coupling formations on the locking ring and adjustment body rotationally couple the locking ring to the adjustment body in the locking position of the locking ring and permit relative rotation of the locking ring and adjustment body in the freeing position of the locking ring. At least one locking spring braced between the chuck body and the locking ring urges the locking ring into the locking position.

13 Claims, 3 Drawing Sheets 24 21 1 2 A 15 14 13 II 18 11 II 23 22 21 V 12 12 9 7 V 8 5.1 5.2 5 4 6 10 3 1 4

SELF-TIGHTENING DRILL CHUCK

FIELD OF THE INVENTION

The present invention relates to a self-tightening drill chuck. More particularly this invention concerns such a chuck used normally on a hammer drill.

BACKGROUND OF THE INVENTION

A self-tightening drill chuck as described in German patent 3,432,918 of the instant inventor has a chuck body centered on and rotatable about an axis, an adjustment body rotatable but axially not displace able on the chuck body, and a plurality of jaws radially displaceable on one of the bodies and each formed with a row of teeth. The other body is formed with a screwthread meshing with the jaw teeth so that rotation of the one body relative to the other body in a tightening direction moves the jaws together and rotation in the opposite direction moves the jaws apart. A locking ring is axially displaceable on the chuck body between a freeing position and a locking position and a tightening spring connected between the locking ring and chuck body urges the locking ring rotationally on the body in the tightening direction. The locking ring is provided with a radially inwardly projecting pin that engages in a radially outwardly open recess of the spindle on which the chuck body is mounted to limit the angular movement of the locking element on the chuck body. Formations couple the locking ring to the adjustment body in the locking position and decouple these parts in the freeing position. A tightening spring urges the locking ring in the tightening direction and a locking spring urges the locking ring into the locking position.

To tighten such a chuck the locking ring is held in one hand and the adjustment body in the other and the adjustment ring is twisted in the tightening direction on the locking ring. Once the jaws engage the chuck, all the relative torque between the adjustment and locking rings is therefore applied at the end of the coupling pin to the drill spindle. This location is relatively close to the axis and relatively small, so that there is a substantial likelihood of material deformation or breakage.

OBJECTS OF THE INVENTION

It is therefore an object of the present invention to provide an improved self-tightening drill chuck.

Another object is the provision of such an improved self-tightening drill chuck which overcomes the above-given disadvantages, that is which solidly and surely blocks the locking ring relative to the chuck body with structure that can be counted on to have a long service life.

SUMMARY OF THE INVENTION

A self-tightening drill chuck has according to the invention a chuck body centered on and rotatable about an axis, an adjustment body rotatable but axially not displaceable on the chuck body, and a plurality of jaws radially displaceable on one of the bodies and each formed with a row of teeth. The other body is formed with a screwthread meshing with the jaw teeth so that rotation of the one body relative to the other body in a tightening direction moves the jaws together and rotation in the opposite direction moves the jaws apart. A radially outwardly projecting tab fixed on the chuck body has a pair of angularly oppositely directed front and back end faces spaced angularly apart by a predetermined tab width. A locking ring axially displaceable on the chuck body between a freeing position and a locking position is formed with a radially inwardly open pocket receiving the tab and having a pair of angularly confronting front and back end faces engageable with the respective end faces of the tab and spaced angularly apart by a distance substantially greater than the tab width so that the tab can move angularly in the pocket. A tightening spring connected between the locking ring and chuck body urges the locking ring rotationally on the body in the tightening direction. Axially interengageable coupling formations on the locking ring and adjustment body rotationally couple the locking ring to the adjustment body in the locking position of the locking ring and permit relative rotation of the locking ring and adjustment body in the freeing position of the locking ring. At least one locking spring braced between the chuck body and the locking ring urges the locking ring into the locking position.

Thus with this arrangement the tab can be spaced relatively far from the chuck axis, thereby increasing the lever arm and the ability of it to withstand angular force, and also this spacing gives room for, according to the invention, a plurality of such tabs in pockets. In fact in accordance with the invention the chuck has three such tabs angular equispaced about the axis and the ring is formed with three such respective pockets also angularly equispaced about the axis. Another advantage of this system is that sufficient room is available for a considerable angular self-tightening stroke of the locking ring on the chuck body.

The chuck body of the invention is provided with an annular coupling ring formed with the tab and the chuck body and coupling ring are formed with complementary angularly interengaging formations rotationally coupling the coupling ring and chuck body together. The chuck body has a rim on which the coupling rim sits and the formation of the coupling ring is a radially inwardly directed bump and the complementary formation of the chuck body is a radially outwardly directed recess receiving the bump. The use of a separate coupling ring that is fitted over a rearwardly projecting cylindrically tubular stem of the chuck body, means that the tabs can be provided without having to machine and weaken the chuck body at all.

The tightening spring according to the invention is a tension spring having one end hooked on the coupling ring and another end hooked on the locking ring. The tension spring is wrapped around and engaging radially inward on the chuck body. The coupling ring is formed with an angularly extending and radially inwardly open recess receiving the tension spring and less than 180° long. The tab is flat and has bent-down edges forming the respective end faces.

In accordance with this invention the pocket has an axially directed cam surface on which the tab rides and which has a ramp and a seat. The ramp and seat are so positioned that as the tab rides up on the ramp the locking ring is cammed into the freeing position and when in the seat the locking ring is held in the freeing position. The seat is positioned at the back end face of the pocket relative to the tightening direction. Furthermore the ramp is angled and the tightening spring is of such a force that the tightening spring alone cannot displace the tab angularly up the ramp to the seat. Similarly the coupling formations are so formed and the tightening spring has a force such that the tightening spring alone cannot make the locking-element formations slip angularly on the adjustment-body formations. These formations are teeth with angled flanks. Thus when the chuck is loosened, the tab will lock in the seat and the coupling formations will be disengaged until the chuck is subsequently tightened on another workpiece.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
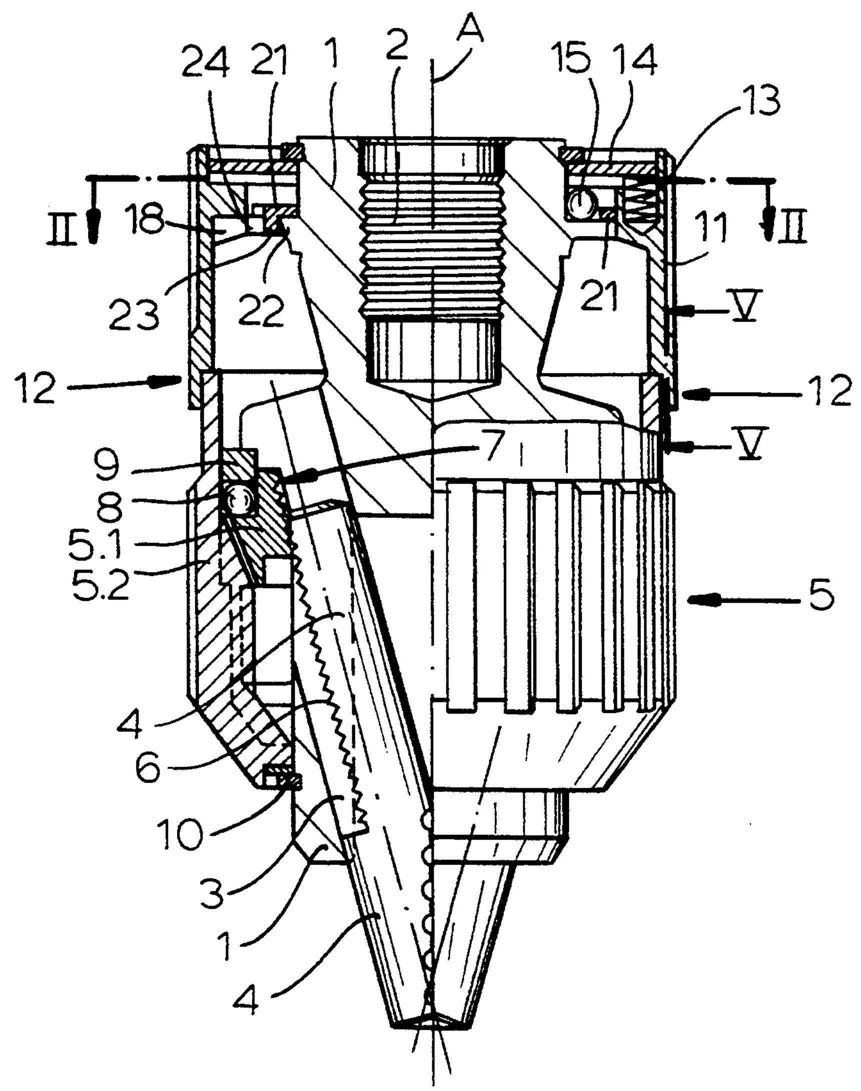
FIG. 1 is a side view partly in axial section through the chuck according to the invention.
Figure 2:
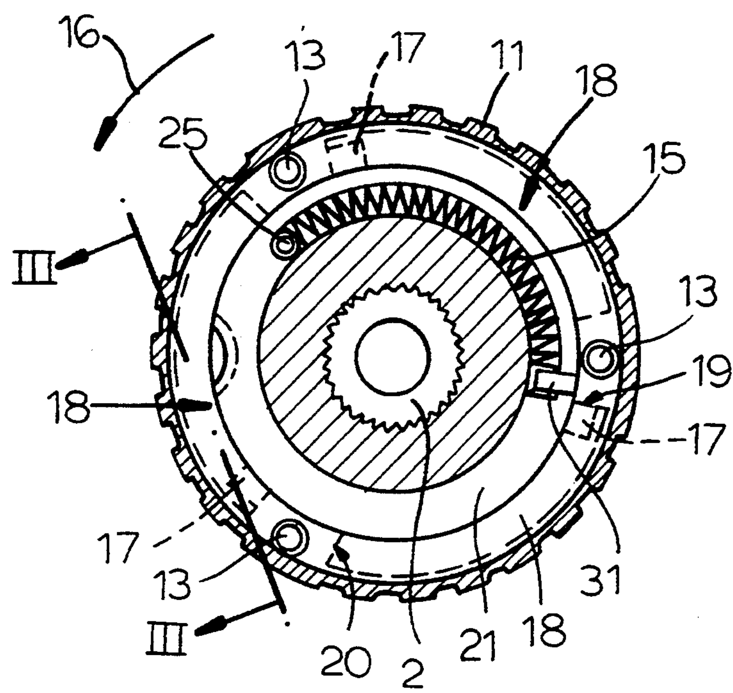
FIG. 2 is a section taken along line II—II of FIG. 1.

As seen in FIGS. 1 and 2 a drill chuck has a chuck body 1 centered on an axis A and formed with a rearwardly open threaded hole 2 adapted to fit on the spindle of a drill, and formed with three angled guide passages 3 equispaced about the axis A and each slidably receiving a respective jaw 4. A two-part adjustment sleeve 5 has an inner ring part 5.1 formed with a screwthread 7 meshing with respective rows of teeth 6 formed on the edge of each jaw 4 and an outer sleeve part 5.2, the two parts 5.1 and 5.2 being fixed to each other. At its rear end the adjustment sleeve 5 is braced via a bearing 8 on a ring 9 set in the body 1 and at its front end on a snap ring 10 so that this sleeve 5 can rotate about the axis A on the body 1 but cannot move axially thereon. As is standard, rotation of the sleeve 5.1 in a forward tightening direction 16 on the body 1 moves the jaws 5 radially inward and axially forward (down in FIG. 1) to close or tighten the chuck and opposite rotation moves them axially backward and radially outward to open or loosen the chuck.

Figure 5:
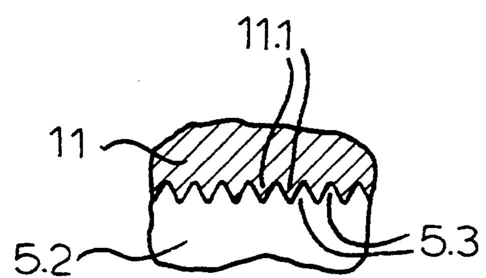
FIG. 5 is a large-scale sectional view taken along line V—V of FIG. 1.

A locking ring or sleeve 11 is rotationally coupled to the sleeve 11 by a slip coupling 12 constituted as seen in FIG. 5 by teeth 11.1 formed on the axial front edge of the sleeve 11 and teeth 5.3 formed on the axial rear edge of the sleeve 5. This sleeve 11 is limitedly axially displaceable on the body 1 and is urged axially forward by three compression springs braced between a rear surface of the sleeve 11 and a washer 14 fixed on the body 1.

Figure 4:
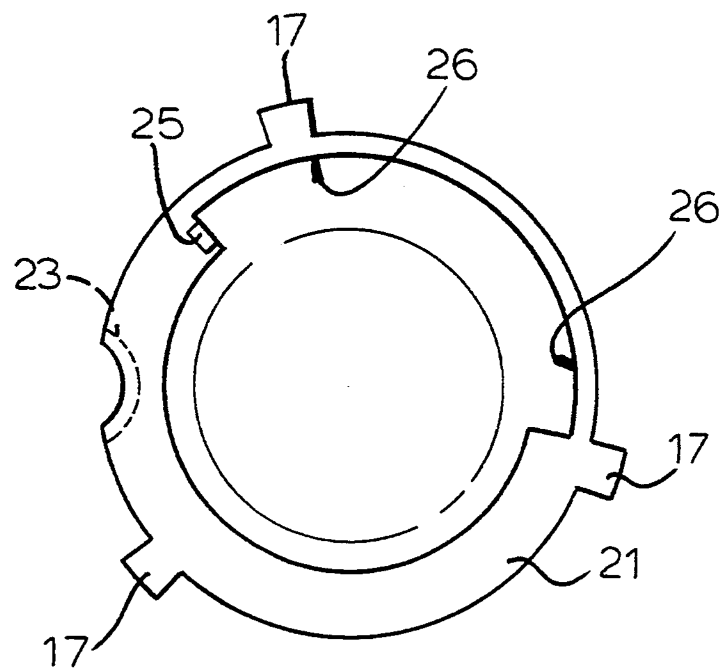
FIG. 4 is a top view of the coupling ring of the chuck body.

According to the invention the chuck body 1 is provided with a coupling ring 21 shown in detail in FIG. 4 and formed with three angularly equispaced and radially outwardly projecting entrainment blocks or tabs 17 each received in a respective radially inwardly open pocket 18 formed in the sleeve 11 and having relative to the forward tightening direction 16 a front abutment end 19 and a rear abutment end 20. This ring is fitted over the chuck body 1 and sits on an integral rim 22 thereof. This rim 22 is formed in turn with a radially outwardly open cutout 24 into which fits a radially inwardly projecting boss 23 formed on the ring 21 to rotationally fix the ring 21 on the body 1.

Thus these bosses 17, which each have an angular dimension of about 10° that is a small fraction of the angular distance of about 90° between the respective abutments 19 and 20, permit the sleeve 11 to rotate limitedly about the axis A on the body 1, in this case through about 80°. The ring 21 is formed of stamped sheet metal and the front and back edges 27 of each tab 17 are turned down so as to provide a bigger surface for engagement with the abutments 19 and 20.

In addition a tension spring 15 accommodated in an angularly extending radially inwardly open pocket 26 of the ring 21 has one end hooked at 25 on the ring 21 and an opposite end hooked at 31 on the sleeve 11 to urge the sleeve rotationally in the forward direction 16 on the body 1. This serves for self-tightening of the chuck as described below. The forces of the spring 13 and 15 and the angles of the flanks of the teeth 11.1 and 5.3 are such that the spring 15 cannot exert enough angular force on the sleeve 11 to cam it up on the teeth 5.3 and make it slip; it takes substantially more angular force exerted on the sleeve 11 to cause the spring 13 to compress enough for the teeth 11.1 to slip on the teeth 5.3.

Figure 3:
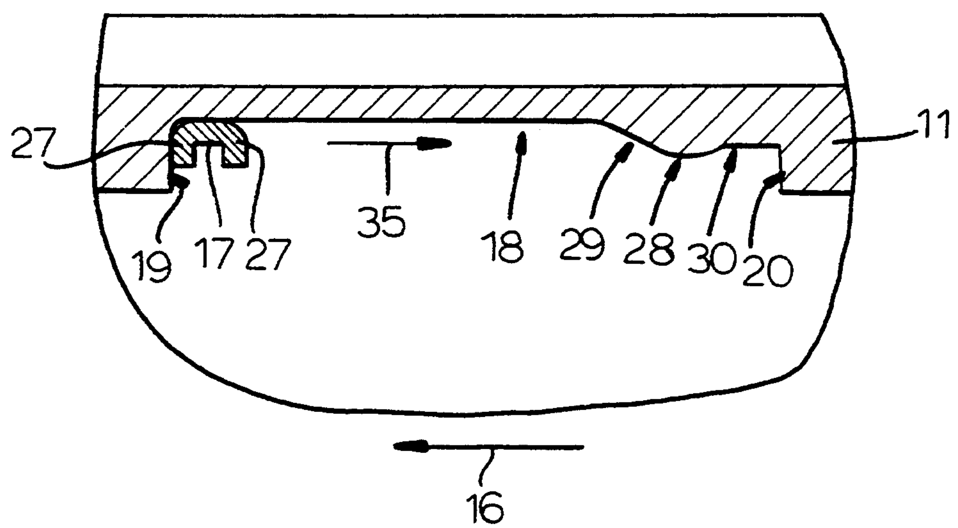
FIG. 3 is a large-scale sectional view taken along line III—III of FIG. 2.

As seen in FIG. 3 each pocket 18 has a base formed as a cam surface 28 that in turn is formed adjacent the trailing (relative to direction 16) end 20 with a ramp 29 and, immediately at the end 20, with a seat 30. Thus as the respective tab 17 moves in direction 35 opposite to the direction 16 it will first engage the ramp 29 to shift the sleeve 11 axially backward and disengage the teeth 11.1 from the teeth 5.3 and then will stop in the seat 30, in which position the teeth 11.1 and 5.3 will be held out of engagement with one another.

The chuck described above works as follows, it being presumed that to start with the tabs 17 are lodged in the seats 30 with the teeth 5.3 and 11.1 out of engagement with each other:

To chuck a bit in the device the sleeve 11 is gripped and held nonrotatably in one hand while the sleeve 5 is rotated with the other hand opposite to the direction 6. Once the jaws 4 are separated enough, the bit is fitted in place and the sleeve 5 is oppositely rotated, that is in direction 16. This all takes place with, as mentioned above, the coupling 12 open. As soon as the jaws 4 seat on the tool, the jaws 4 and body 1 will start to rotate with the sleeve 5, thereby moving the abutment tabs 17 of the ring 21 in the stationary sleeve 11 out of the seats 30 and down the ramps 29 so that the teeth 5.3 and 11.1 will mesh with one another. These teeth 5.3 and 11.1 will slip on one another until the tabs 17 engage the respective front abutment ends 19 at which time the body 1 can no longer rotate relative to the sleeve 1. Further rotation of the sleeve 5 will therefore tighten the chuck since the body 1 is held nonrotatable in the sleeve 11 by the three tabs 21 so that considerable torque can be applied without danger to the equipment. This action also stretches the spring 15 so that, when the sleeve 11 is released, the spring 15 is at maximum extension, biasing the sleeve 11 in the direction 16 on the body 1. The parts are in the position of FIGS. 1 through 3. As mentioned above, the force of the spring 15 is not enough to make the sleeve 11 slip on the sleeve 5 when the coupling 12 is closed.

During boring the jaws 4, in particular when hammer-drilling, tend to bite somewhat into the shank of the drill bit, or to shift and find a different purchase, so their hold loosens. In this case the spring 15 pulls the sleeve 11, and the sleeve 5 coupled to it at 12, forward and takes up this slack. During this self-tightening action the tabs 17 move backward on the cam surfaces as indicated by the arrow 35 in FIG. 3. If the self-tightening action is considerable, the tabs 17 will ride up on the ramps 29 and end self-tightening by decoupling the sleeves 5 and 11 from each other.

To open the chuck and release the tool, the sleeves 5 and 11 are again gripped and the sleeve 5 is rotated against the direction 16 relative to the sleeve 5. Since the jaws 4 are tightly gripping the tool, the chuck body 1 will initially rotate with the sleeve 5, so that the tabs 17, if they have not already, will ride up on the ramps 29 and drop into the seats 30, thereby opening up the coupling 12. Once in this position the body 1 is, once again, arrested in the sleeve 11 by engagement of the three tabs 17 against the abutments 20 and further rotation of the sleeve 5 will rotate this sleeve 5 relative to the body 1, spreading the jaws 5. During such opening of the chuck the coupling will be disengaged so that the teeth 5.3 and 11.1 will not slip on each other. This returns the structure to the starting position.

We claim:

1. A self-tightening drill chuck comprising:

a chuck body centered on and rotatable about an axis;

an adjustment body rotatable but axially not displaceable on the chuck body;

a plurality of jaws radially displaceable on one of the bodies and each formed with a row of teeth, the other body being formed with a screwthread meshing with the jaw teeth, whereby rotation of the one body relative to the other body in a tightening direction moves the jaws together and rotation in the opposite direction moves the jaws apart;

a radially outwardly projecting tab fixed on the chuck body having a pair of angularly oppositely directed front and back end faces spaced angularly apart by a predetermined tab width;

a locking ring axially displaceable on the chuck body between a freeing position and a locking position and formed with a radially inwardly open pocket receiving the tab and having a pair of angularly confronting front and back end faces engageable with the respective end faces of the tab and spaced angularly apart by a distance substantially greater than the tab width, whereby the tab can move angularly in the pocket;

a tightening spring connected between the locking ring and chuck body urging the locking ring rotationally on the body in the tightening direction;

axially interengageable coupling formations on the locking ring and adjustment body rotationally coupling the locking ring to the adjustment body in the locking position of the locking ring and permitting relative rotation of the locking ring and adjustment body in the freeing position of the locking ring; and at least one locking spring braced between the chuck body and the locking ring urging the locking ring into the locking position.

2. The self-tightening drill chuck defined in claim 1 wherein the chuck has three such tabs angular equispaced about the axis and the ring is formed with three such respective pockets also angularly equispaced about the axis.

3. The self-tightening drill chuck defined in claim 1 wherein the chuck body is provided with an annular coupling ring formed with the tab and the chuck body and coupling ring are formed with complementary angularly interengaging formations rotationally coupling the coupling ring and chuck body together.

4. The self-tightening drill chuck defined in claim 3 wherein the chuck body has a rim on which a coupling rim sits.

5. The self-tightening drill chuck defined in claim 3 wherein the formation of the coupling ring is a radially inwardly directed bump and the complementary formation of the chuck body is a radially outwardly directed recess receiving the bump.

6. The self-tightening drill chuck defined in claim 3 wherein the tightening spring is a tension spring having one end hooked on the coupling ring and another end hooked on the locking ring, the tension spring being wrapped around and engaging radially inward on the chuck body.

7. The self-tightening drill chuck defined in claim 6 wherein the coupling ring is formed with an angularly extending and radially inwardly open recess receiving the tension spring and less than 180° long.

8. The self-tightening drill chuck defined in claim 1 wherein the tab is flat and has bent-down edges forming the respective end faces.

9. The self-tightening drill chuck defined in claim 1 wherein the pocket has an axially directed cam surface on which the tab rides and having a ramp and a seat, the ramp and seat being so positioned that as the tab rides up on the ramp the locking ring is cammed into the freeing position and when in the seat the locking ring is held in the freeing position.

10. The self-tightening drill chuck defined in claim 9 wherein the seat is positioned at the back end face of the pocket relative to the tightening direction.

11. The self-tightening drill chuck defined in claim 9 wherein the ramp is angled and the tightening spring is of such a force that the tightening spring alone cannot displace the tab angularly up the ramp to the seat.

12. The self-tightening drill chuck defined in claim 1 wherein the coupling formations are so formed and the tightening spring has a force such that the tightening spring alone cannot make the locking-element formations slip angularly on the adjustment-body formations.

13. The self-tightening drill chuck defined in claim 1 wherein the formations are teeth with angled flanks.

* * * * *